United States Patent [19]
Brean

[11] 3,722,984
[45] Mar. 27, 1973

[54] DAY-NIGHT MIRROR FOR VEHICLES

[75] Inventor: John W. Brean, Cincinnati, Ohio

[73] Assignee: D. H. Baldwin Company, Cincinnati, Ohio

[22] Filed: June 29, 1971

[21] Appl. No.: 157,941

[52] U.S. Cl..................................350/280, 350/289
[51] Int. Cl............................B60r 1/06, G02b 7/18
[58] Field of Search......................350/280, 282, 283

[56] References Cited

UNITED STATES PATENTS

| | | | |
|---|---|---|---|
| 1,919,475 | 7/1933 | McKinley | 350/280 |
| 3,001,015 | 9/1961 | Weiss | 350/276 SL UX |
| 3,132,201 | 5/1964 | Bertell et al. | 350/282 |
| 3,574,446 | 4/1971 | Moore | 350/283 |

FOREIGN PATENTS OR APPLICATIONS

| | | | |
|---|---|---|---|
| 1,045,935 | 7/1953 | France | 350/280 |
| 1,131,236 | 10/1968 | Great Britain | 350/280 |

*Primary Examiner*—John K. Corbin
*Attorney*—W. H. Bruenig et al.

[57] ABSTRACT

A system for simultaneously sensing, by means of photo-resistors, ambient light and light from an energized headlamp from a vehicle following a vehicle, and in response to the signal outputs of the photo-resistors causing an oscillatory mirror to move selectively into proximity and parallel with a sheet of glass facing always rearwardly of the truck, or, into 45° relation to the pane of the glass. In the latter condition the mirror reflects light into a black absorbing surface, while the sheet of glass reflects light with low efficiency to the eyes of the driver of the truck, whereas in the former condition mirror reflects light with high efficiency to the eyes of the driver. The mirror is in the parallel position during daylight and at night if no following vehicle is close, but goes to the 45° position at night if a following headlamp is sensed. To avoid plural images, the mirror is made of a sheet of glass which is aluminum coated on its front surface, so that light does not pass through the glass of the mirror in proceeding from the following headlamp to the eye of the driver. Electric current is passed through the aluminum coating of the mirror to generate heat and thus to maintain the mirror and the inner surface of the first mentioned sheet of glass free of ice and fog.

21 Claims, 8 Drawing Figures

PATENTED MAR 27 1973　3,722,984

INVENTOR
JOHN W. BREAN
By W. H. Brewig
Hyman Hurwitz AGENT
ATTORNEY

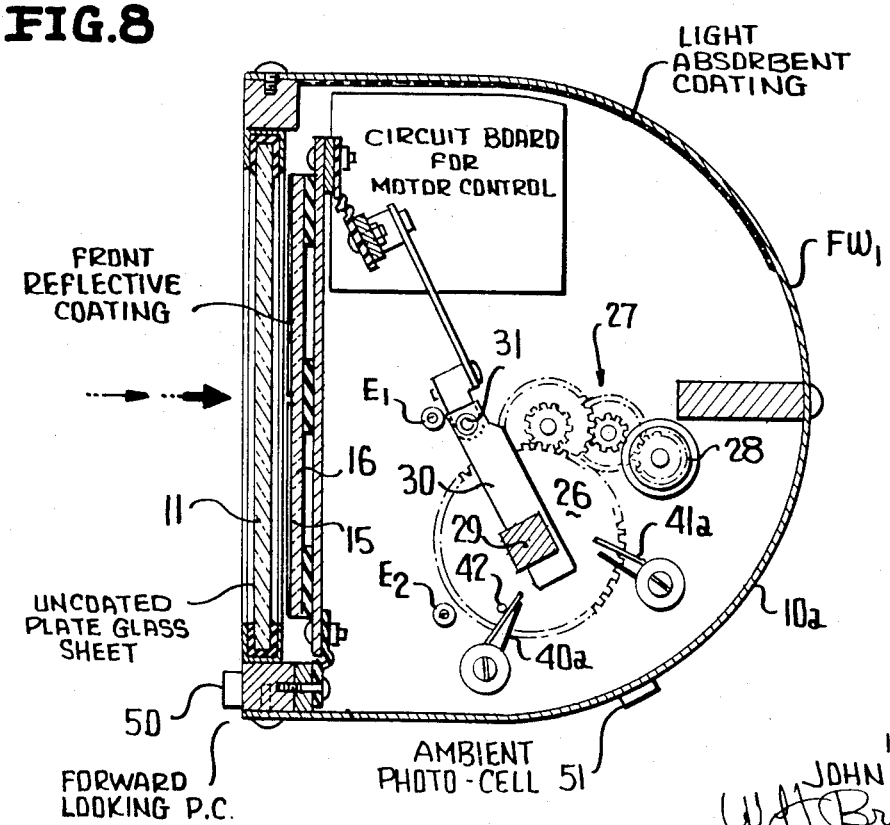

3,722,984

DAY-NIGHT MIRROR FOR VEHICLES

BACKGROUND OF THE INVENTION

Photo-cell controlled day-night mirrors for automotive vehicles are well known. In the case of passenger vehicles, such mirrors have in the past been photo-electrically controlled normally to have high reflectivity, and to have low reflectivity if a further vehicle is closely following with energized headlamps. Reference is made to a co-pending application of Jordan et al., Ser. No. 24,593, filed Apr. 1, 1970, now U.S. Pat. No. 3,680,951, entitled Photo-electrically Controlled Rear View Mirror, which is assigned to the assigns of this application. However, no such automatic system applicable to use externally of a vehicle, such as a large truck, has heretofore been devised. Day-night rear view mirrors so useful on large trucks and other vehicles exist, but these have not heretofore been automatic. Externality requires that the mirror be large, so that it may be viewed by drivers of various heights, occupying a variety of driving positions, and be useful in a variety of vehicles. The location of the mirror in turn presents problems of handling large amounts of light without blinding the driver and of protecting the unit as a whole, but particularly its mirror, from rain, snow, dirt and moisture.

SUMMARY OF THE INVENTION

A photo-electrically controlled rear view mirror system for a truck employing an uncoated sheet of glass as the sole reflecting surface, in one operating condition, and a further front surface coated mirror employed in conjunction with the glass as the reflecting medium in a further operating condition. The coated mirror is swung through an angle of 45° to render it inoperative, and in that orientation it reflects light originating from rearward of truck onto a black absorbing surface, so that it is totally optically disabled from the viewpoint of the driver of the truck, and the uncoated sheet alone is then operative. The coating of the mirror is parallel with the plate of uncoated glass and slightly spaced therefrom in a further operating condition, so that the coated sheet then becomes the predominant effective reflective element.

BRIEF DESCRIPTION OF THE DRAWINGS

FIG. 7 is a view in perspective of a modification of the system of FIGS. 1-6; and FIG. 8 is a view in cross section taken on line 8—8 of FIG. 7.

DESCRIPTION OF THE PREFERRED EMBODIMENT

Figure 1:
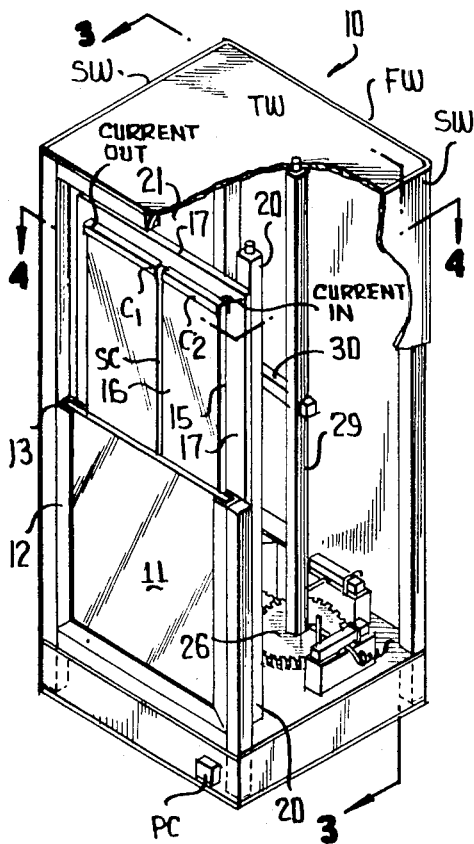
FIG. 1 is a view in perspective of a rear view mirror assembly, according to the present invention, which is suitable for mounting on a truck.
Figure 3:
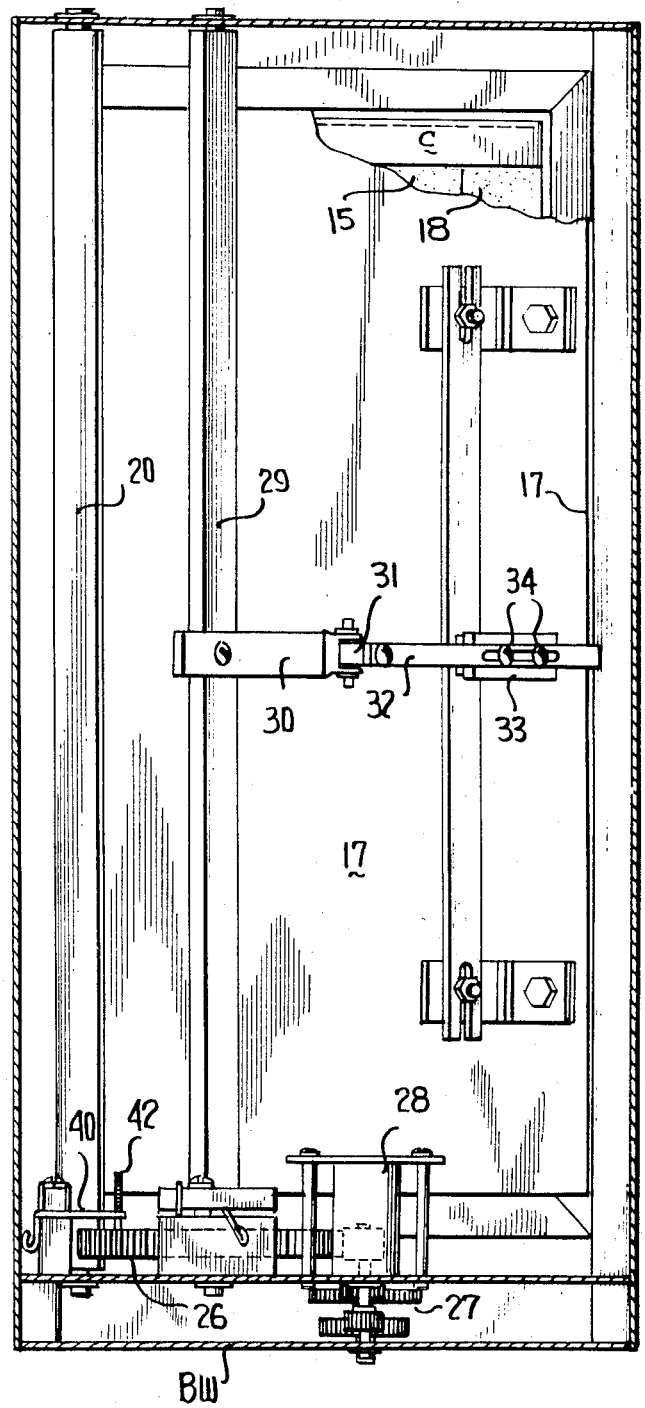
FIG. 3 is a sectional view taken on the line 3—3 of FIG. 1.

In FIG. 1 is illustrated an enclosure 10 having four side walls, SW, and a top and bottom wall, TW and BW, constituting a closed rectangular parallelopiped. All the walls are opaque except the rear wall, which includes a flat sheet of plate glass 11, uncoated, mounted in a surrounding frame 12, and directly supported by a resilient vibration and stress absorbing gasket 13 supported within the frame 12. The sheet of glass 1 faces rearwardly of a truck and is mounted exteriorly thereof, with its plane extending so that the truck driver sees images perpendicularly of the direction of travel of the truck, and well offset from the body of the truck so that it may intercept, over its entire surface, light emitter by the headlamps of following vehicles, and full view of other rearward objects. The sheet of plate glass 11 constitutes a mirror of low reflectivity, i.e., is transparent to perhaps 90 percent of the light falling thereon and reflects the remainder, and therefore is suitable for reflecting the light of the following headlamp without blinding the driver of the truck. It is essential to proper operation that the sheet of plate glass 11 have flat, parallel surfaces, to avoid double images, and also that it be relatively thin; ⅛ inch glass is used.

Behind the sheet of glass 11, is located a mirror 15, coated on its front surface 16 with a thin layer of aluminum A. The mirror 15 must have a flat front surface, is made of glass and is mounted on an oscillatory frame 17, via pads of resilient material 18 which absorbs shock and vibration and also prevents distortion of the flatness of the glass. The frame 17 is secured to a vertical post 20, located adjacent a corner of enclosure 10, and rotatable on its axis and pivoted at its ends in the top and bottom walls of the enclosure 10. The mirror 15 is intended to have two positions, one in which it is slightly spaced from but precisely parallel with the adjacent surface of glass plate 11, and the other in which it is turned through 45°. In the latter position incoming light is reflected toward a blackened or light absorbing surface 21, so that the mirror 15 is effectively totally removed from the optical system, insofar as is evident to the driver of a vehicle on which the device of the invention is mounted and operative. At that time the sole reflective surfaces available in the device are those provided by the sheet of glass 11. Both surfaces of the sheet of glass 11 are slightly reflective, so that theoretically, when the mirror is not in reflecting position the possibility is raised that absent correct design, the viewer may perceive plural reflected images directly from each surface, and also after multiple internal reflections taking place between these surfaces. However, it can be shown that if the surfaces are very flat and parallel, and in close proximity, the two images from the front surface and the rearwardmost surface 23 are close enough together so that negligible difference is observed of an object rearward of the vehicle. On the other hand, with mirror 15 in the parallel position, i.e., during daylight or with no following headlamps at night, intensity of the image provided by mirror 15 is sufficiently greater than the image provided by sheet 11, that the image provided by sheet 11 is effectively invisible or unnoticeable to the human eye, and a clear, sharp, image of the rearward scene is presented to the driver. This result requires that the mirror 15 be very close to the sheet of plate glass 11, and a distance of 0.015 inch is used, and also that it be precisely parallel to the sheet of plate glass 11, and flat.

The inclusion of a reflecting coating 16 on the front surface of mirror 15 assures that no double images will be produced by the mirror, since no light penetrates into the glass of the mirror. Were the mirror 15 reflectively coated on its back surface, light from following vehicles would have to pass through the glass to reach the reflecting surface, and an image would then be reflected from the uncoated surface of the mirror as well as from the coating. This would provide a reflection deriving from the uncoated surface of mirror 15, which would have the same order of intensity as the images provided by the uncoated sheet of glass 11, but which would, due to mechanical imperfections, derive from a surface not precisely parallel with the two surfaces of the sheet of glass 11. Double images would result which are highly objectionable, whereas double images deriving from two precisely parallel surfaces are not obtrusive even if the surfaces are not precisely flat, because the latter are only slightly displaced and duplicates, while the former can be quite radically displaced, and also because the latter are duplicated images which do not form a blur, but the former are not likely to be duplicate and hence provide a highly blurred image. Duplication of images derives largely from lack of parallelism of reflecting surfaces from which the images derive. Such parallelism of reflecting surfaces from which the images derive. Such parallelism obtains precisely in respect to opposite sides of a well-made sheet of glass, but is extremely difficult to achieve in respect to surfaces of two separate sheets.

It is important to provide heat, in the device of the invention, to reduce moisture and fogging or icing of reflective surfaces. Moisture, if present in the enclosure 10 appears as fog, rime or ice, and tends to coat mirror surfaces, reducing reflectance almost totally. The aluminum coating 16 on mirror 15, is found to have almost precisely half the correct resistivity to provide resistance measured between its upper and lower edges capable of dissipating about 70. watts of electrical energy. This quantity of heat, expended adjacent the sheet of glass 11, is quite sufficient to maintain the required reflectivities of all the reflecting surfaces located interiorly of the vertical enclosure 10. To provide correct resistance the reflective surface 16 is scored as to SC to form two discrete circuits, which are connected electrically in series. Enough heat is generated by the series circuit to maintain the interior reflecting surfaces of the enclosure free of frost and ice. The scoring can separate the reflective surfaces by 10 mils, which is not usually noticeable to the driver of the vehicle. Current is introduced via clamp $c_1$, and taken out via a similar clamp $c_2$, at the top of the mirror and the two bottom halves of the mirror coating are joined by a clamp extending entirely across the bottom (not shown) of the mirror.

Figure 2:
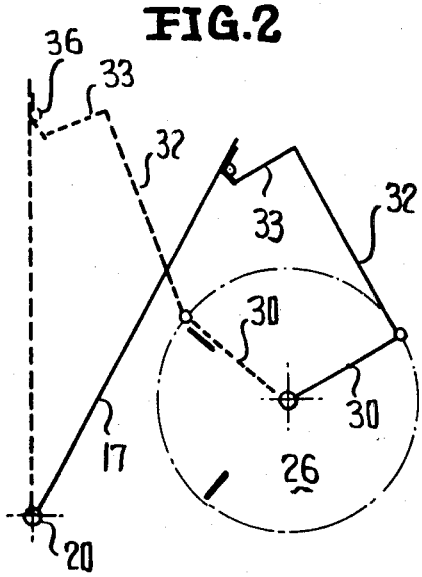
FIG. 2 is a diagram of the mechanical movements of certain lever arms in the system of FIG. 1.
Figure 4:
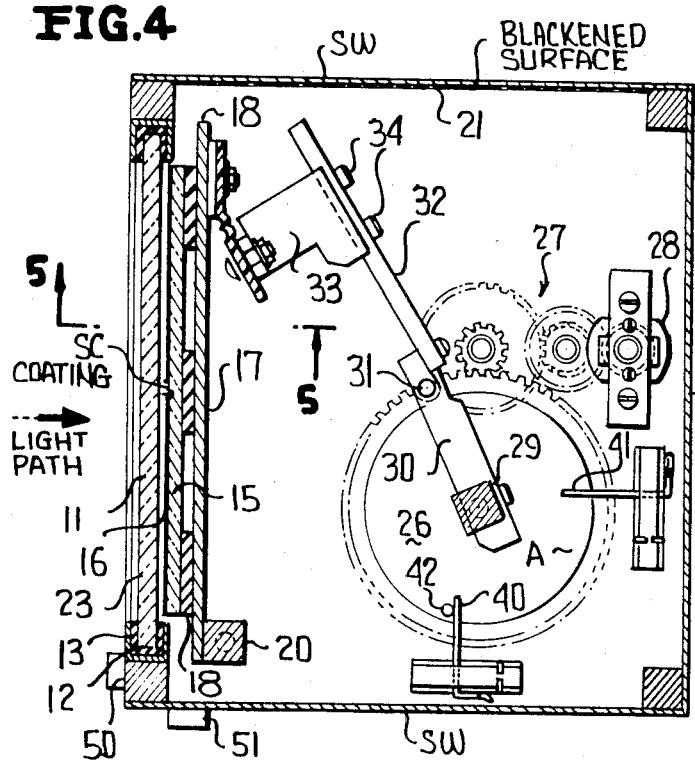
FIG. 4 is a view in section taken on the line 4—4 of FIG. 1.
Figure 5:
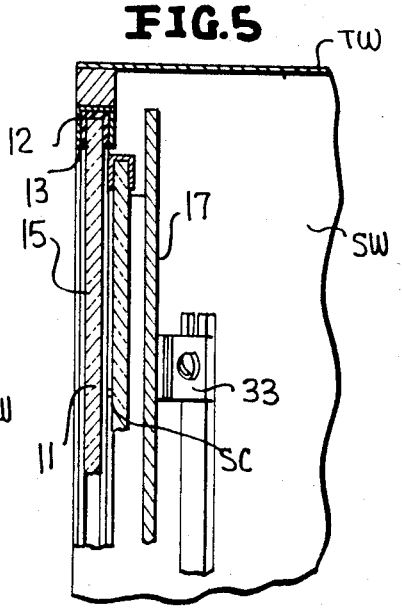
FIG. 5 is a view in section taken on the line 5—5 of FIG. 4.

The mechanism for rotating mirror 17 is best examined in connection with FIG. 4 of the drawings. A gear 26, driven via gear train 27 from a reversible DC motor 28, rotates a vertical rod 29 pivoted at its ends in the upper and lower walls of enclosure 10. Rigidly connected to the rod 29 is a level arm 30, which is pivotally secured at its free end to a lever arm 32, by pivot 31. The latter is linked to the free end of supporting plate 17 by coupling 33. The latter is secured to lever arm 32 by bolts 34, which enable adjustment of the position of coupling 33 along the length of lever arm 32, to facilitate adjustment of final position of plate 17. FIG. 2 provides a schematic representation of the movements of arms 30 and 32. When gear 26 rotates clockwise, as seen in FIG. 2, plate 17 is drawn clockwise about its pivot point 20, and vice versa.

A flexing point is provided at 36 in terms of a plastic hinge between arm 33 and plate 17, to enable arm 33 to assume a wide variety of angular relations with respect to plate 17. The stop positions of gear 26, which determine the two final angular relations of mirror 15 to sheet 11, are established by the positions of two stationary switch contacts 40, 41 (FIG. 4) which are in the form of rigid wires secured to the enclosure and extending radially of the gear, and which interact with a vertically extending flexible vertical grounding contact 42, secured to the gear. When movable contact 42 mates with stationary contact 40, a point of the motor drive circuit (FIG. 6) is grounded, and the motor 28 which drives gear 26 is stopped and mirror 15 is then in 0° position. When movable contact 42 comes about to stationary contact 41, a second circuit point is grounded and the mirror 26 is then in its 45° position. Mechanical stops (not shown) are provided which precisely terminate the motion of the mirror in its ultimate position, the switches 40, 41 not being sufficiently precise.

Figure 6:
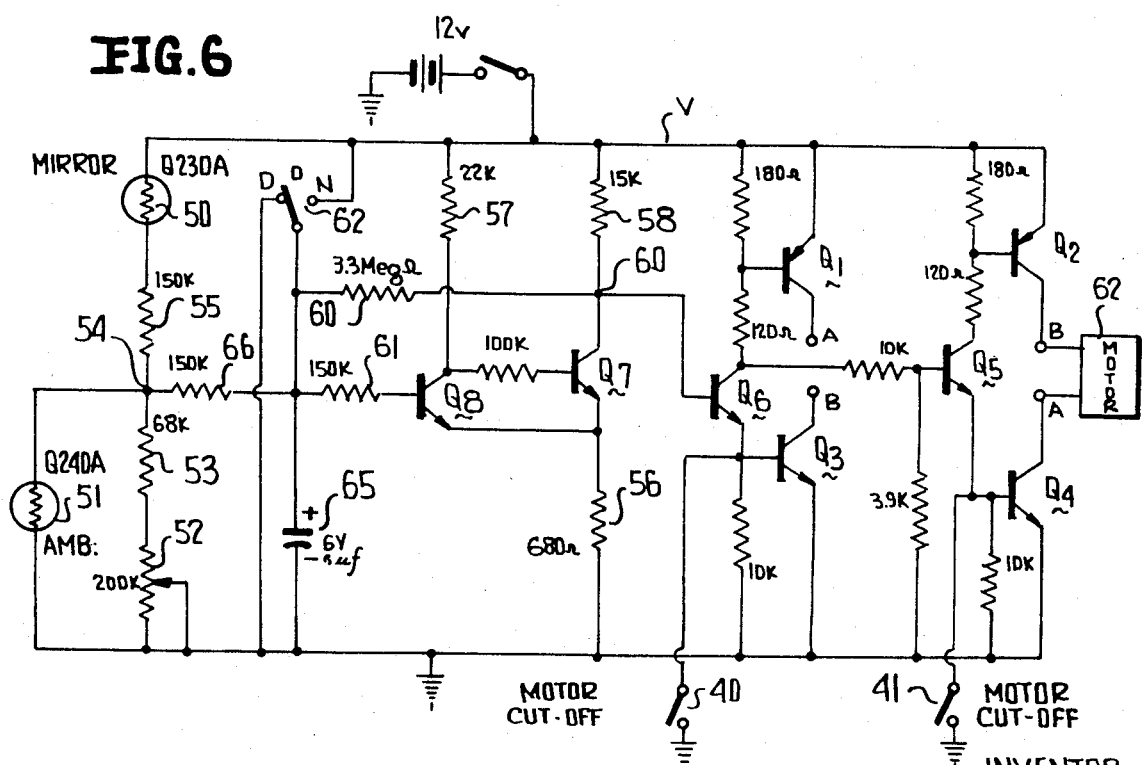
FIG. 6 is a schematic circuit diagram of a motor control circuit, employed in the device of FIGS. 1-5; inclusive.

Referring now to the circuit diagram of FIG. 6, photo-cell 50 senses light directed from rearward of the glass plate 11, while photo-cell 51 looks off to the side, and hence is responsive to ambient light only, at least steady state. The cell 51 is shunted by a variable resistance 52 in series with a fixed smaller resistance 53. When cell 51 is fully illuminated, its resistance is small and represents essentially the total resistance between junction 54 and ground. This resistance then matches the resistance of cell 50, but the latter is in series with a rather large resistance 55. It follows that junction point 54 is at low voltage so long as both photo-cells 50 and 51 are equally illuminated in daylight; point 54 is at rather low voltage above ground, and that this is also true at night, so long as there is no nearby rearward source of light. The junction 54 is DC connected to the base of transistor Q8, and that transistor has its emitter connected to ground via a small voltage dropping resistance 56, and its collector to 12 V via a relatively large resistance 57. A further transistor Q7 has its base connected to the collector of Q8, its emitter connected to resistance 56 and its collector connected via resistance 58 to the 12 V If Q8 is conductive the total voltage from collector to emitter of Q8 is connected across the base to collector of Q7. This is negligible and maintains Q7 non-conductive. If Q8 is non-conductive the voltage of V appears at the base of Q7 and renders the latter conductive. The voltage at the collector of Q7 is then low, due to a voltage drop in resistance 58, and this voltage is communicated to the base of Q8 via resistances 60, 61 and holds Q8 non-conductive. Q7, Q8 is thus a bistable circuit, the state of which is controlled by the value of voltage existing at junction 54. In daylight that voltage is quite low. As the ambient light varies that voltage increases, but even at night is low. At night cell 50 has a very high resistance, which is in series with the resistance of 53 and 52 in series, of value which can be adjusted. In full daylight the voltage at junction 54 is determined by the relative values of resistance 55 and the very low resistance of cell 51. Therefore Q8 is always conductive and Q7 non-conducts in response to full day and full night ambient conditions so long as the photo-cells 50, 51 are equally illuminated.

Whether Q7 is conductive or not determines whether point 60 is low or high in voltage. If low, Q6 is cut-off and if high Q6 is conductive. Q6 controls the conductivity of Q5, rendering Q5 conductive if Q6 is non-conductive, and vice-versa. Q6 controls the conductivity of Q1, Q3 in series, rendering them conductive if Q6 is conductive, and vice-versa if Q6 is non-conductive. Q5 controls Q2 and Q4 in series. Point A of Q1 is connected to point A of Q4. Point B of Q3 is connected to point B of Q2. A DC motor is connected between points A and B.

When Q6 is non-conductive, the base and emitter of Q1 are at the source voltage, and the base and emitter of Q3 are essentially connected to ground. When Q6 is conductive the base of Q1 goes negative relative to its emitter, and Q1 being PNP, its becomes conductive, the base of Q3 goes positive relative to its emitter, and Q3 being NPN, Q3 becomes conductive. A similar explanation holds for Q2 and Q4. But, the connections to motor 62 being in one sense for Q1, Q3 and in the opposite means for Q2, Q4, the motor runs in opposite directions according as Q6 is or is not conductive.

Switches 40, 41 serve to ground the bases of Q3, Q4, respectively, and accordingly, either of these transistors can be cut off, if conductive, by closing the associated switch. These switches are physically illustrated in FIG. 8 under the same numeration as in FIG. 6.

The operation of the photo-cells 50, 51 (which are in fact photo-resistors, as illustrated) can be disabled by manual single pole, three position switch 62, which either permanently grounds the base of Q8 and renders it non-conductive, or permanently connects that base to V and renders Q8 conductive, or renders automatic operation for its center position.

Capacitor 65 is connected via resistance 6 to junction point 54, and the base of Q8, which provide a delay circuit, preventing short transient variations of voltage at junction 54, deriving from short light intensity variations, from affecting the conductivity of Q8. These can occur, for example, as the vehicle passes street and road lamps and cars passing in opposition.

During night operation of the system, with switch 62 in automatic position (center contact), if cell 50 is illuminated by a headlamp following the truck on which the present system is installed, the resistance between V and point 54 equals essentially that of resistance 55, whereas the voltage between point 54 and ground is near that established by resistances 55, 53 and 52 in series. This voltage is set to render Q8 conductive. At dusk and at night, adjustment of resistance 52 can be selected to determine whether or not Q8 will be conductive, when cell 50 is illuminated at any given level, i.e., for any given distance of the following vehicle.

The motor 62 always turns until such time as a motor cut-off is signalled by closure of one of switches 40, 41, in FIG. 6, but representing the rotative grounding contact 42, contacting stationary contact 40, for daylight operation. At night, when the system is illuminated by a following headlamp, the mirror 15 is at its 45° position, while for daylight operation the mirror has the position illustrated in FIG. 4 and grounding contact 42 contacts stationary contact 41.

Since the system of FIGS. 1–6 moves at high speed, when on a moving vehicle, the forward wall FW and the side walls SW of the enclosure 10 of FIG. 1 are rounded off into one wall of approximately semi-circular configuration FW, to reduce windage. The unexpected result has been achieved, that a slip stream is formed rearwardly of the mirror, which flows dust, debris, snow and rain past the glass surface 11, keeping the latter clean and reflective with a minimum of attention even under severe driving conditions.

The mechanism which moves coated mirror 15, is essentially the same as is employed in the system of FIGS. 1–6 of the accompanying drawings. The switches 40, 41 of FIG. 4 are replaced by two contact pairs providing normally open switches 40a, 41a, which are closed by vertically extending pin 42, which serves to bend one flexible contact of a pair toward the other, which is rigid. The circuitry of FIG. 6 is again employed. Accordingly, the sole significant distinction between the two species relates to the shape of the enclosures 10 (FIG. 1), 10a (FIG. 7, the latter providing an aerodynamic surface and the former not. Optical principles are the same in both devices.

The physical relation of the photo-cells 51, 52 to the enclosure 10 is illustrated, these relations are subject to considerable variation, since it is only required that one cell see only ambient light and be shielded from the light directed from the rear of the truck, whereas the other sees light directed from the rear of the truck but is also, inevitably exposed to ambient light. Various devices may be employed to stop the ultimate angular positions of the mirror. Particularly adjustable eccentrics E1 and E2 are employed, since these can be accurately set. The stop for day position of the mirror is particularly important, since this assures that the plate glass — and the mirror — are in fact precisely parallel. The 45° position of the mirror can be subject to some inaccuracy without involving defective operation.

The enclosure 10 is wholly enclosed, to provide protection against inclement weather and insects and flying debris, but has enough leakage to enable internal air pressure to adjust itself to ambient atmospheric pressure.

What I claim is:

1. A day-night mirror for a vehicle, comprising an enclosure having side, bottom and top walls, one of said side walls including a pane of glass stationary with respect to said enclosure, an oscillatory mirror having two surfaces and located interiorly of said enclosure, one of said surfaces being, in one orientation of said mirror, parallel with an immediately adjacent surface of said pane of glass but displaced therefrom by a distance of the order of 0.015 inch, said one of said surfaces of said mirror being coated with a reflective surface, means for rotating said mirror through an angle of substantially 45° with respect to said surface of said pane of glass and back to parallelism with said pane of glass, and means located within the enclosure for totally absorbing light reflected by said mirror while at said angle of 45°.

2. The combination according to claim 1, wherein said means is a photo-cell controlled reversible rotatable motor system for selectively rotating said mirror between said first and second positions according to the intensities of light sensed from two approximately orthogonal directions.

3. The combination according to claim 2, wherein said photo-cell controlled motor system includes an ambient light sensing photo-resistor and a further light sensing photo-resistor looking backwardly of said vehicle, wherein said motor of said system is a DC rotatable motor, and wherein is provided transistor logic circuitry for directing direct current reversibly to said motor according as ambient light is at high level or as ambient light is at low level and the headlamp of a following vehicle is directed against said further photo-resistor.

4. The combination according to claim 3, wherein is provided means for adjusting said level.

5. The combination according to claim 1, wherein said means for totally absorbing light is a blackened coating on an interior of a wall of said enclosure making an angle of 90° with said plate of glass and of 45° with respect to said mirror while said mirror is at said angle of 45°.

6. A day-night mirror for a vehicle, comprising an enclosure having side, bottom and top walls, one of said side walls including a pane of glass stationary with respect to said enclosure, an oscillatory mirror having two surfaces and located interiorly of said enclosure, one of said surfaces being, in one orientation of said mirror, parallel with an immediately adjacent surface of said pane of glass but displaced therefrom by a distance of the order of 0.015 inch, said one of said surfaces of said mirror being coated with a reflective surface, means for rotating said mirror through an angle of substantially 45° with respect to said surface of said pane of glass and back to parallelism with said pane of glass, and means for totally absorbing light reflected by said mirror while at said angle of 45°, wherein said means for rotating said mirror includes a photo-cell circuit for detecting whether a source of illumination is closely following said vehicle at night and a reversible DC motor responsive to said photo-cell circuit for rotating said mirror in alternative senses of rotation according as said source of illumination is or is not closely following said vehicle at night.

7. The combination according to claim 6, wherein said means responsive to said photo-cell circuit includes two transistor switching circuits arranged to deliver current to said motor in respectively opposite directions, and means for rendering said switching circuits alternatively conducting according as said source of illumination is or is not closely following said vehicle at night.

8. The combination according to claim 7, wherein said photo-cell circuit includes one photo-cell oriented to sense the amplitude of light arriving from rearwardly of said vehicle and one photo-cell for sensing the amplitude of ambient light, a flip-flop, means responsive to the relative amplitudes of said lights as sensed by said photo-cells for transferring said flip-flop from one of its states to the other of its states, and means responsive to the state of said flip-flop for alternatively rendering said switching circuits conducting according to the state of said flip-flop.

9. The combination according to claim 8, wherein said electronic switches each comprises a pair of transistors of opposite conductivity types and a drive transistor for rendering said pairs of transistors alternatively conductive and non-conductive, said motor being connected between said transistors of opposite conductivity types of each said pairs and in series therewith.

10. The combination according to claim 9, wherein said drive transistors are connected in cascade as switching transistors and are of the same conductivity types, whereby said drive transistors are alternatively always one conductive and the other non-conductive.

11. The combination according to claim 8, wherein is included manually operative means for at will setting said flip-flop in either of its states.

12. The combination according to claim 7, wherein is provided means for by-passing transients from said switching circuits.

13. A day-night mirror for a vehicle, comprising an enclosure, said enclosure including in a vertical one of its walls a flat pane of glass, means mounting said pane of glass in resilient material at all its edges to forestall bending of said pane of glass, a front coated mirror, a vertical pivot, means securing said front coated mirror to said vertical pivot for rotating with said vertical pivot, resilient means securing said mirror to said last mentioned means to forestall bending of said mirror, means for accurately positioning said mirror parallel to the plane of said sheet of glass and separated therefrom by about 0.015 inch, wherein said coated mirror has a reflective coating of metal and means for passing electrical heating current through said reflective coating of metal in uniform current density in the plane of said coating.

14. A day-night mirror system for a vehicle, comprising an enclosure, a stationary pane of glass included in one vertical wall of said enclosure, said stationary pane of glass having precisely flat parallel surfaces capable of reflecting light impinging on each of said surfaces, said pane of glass being about ⅛ inch thick, a front coated mirror, means pivotally mounting said mirror for rotation about an axis adjacent one of its vertical edges, means for rotating the plane of said mirror about said means pivotally mounting said mirror, two normally open switches closable in response respectively to attainment by said mirrors of angles of 0° and 90° with respect to the plane of said pane of glass, a reversible DC electric motor, means responsive to closures of said switches for terminating current flow to said motor regardless of the direction in which it is rotating, and photosensitive means for rotating said motor in one direction or another as a function of ambient and directive luminous intensities at said pane of glass.

15. The combination according to claim 14, wherein is included a switch actuator, means driven by said motor for moving said switch actuator, said switches being located relative to said switch actuator such that said switches are open selectively by said switch actuator according as said mirror is in its 0° or its 90° orientation.

16. The combination according to claim 15, wherein said photosensitive means includes a solely ambient light sensing photoresistor, a directed light sensitive resistance, means connecting said light sensitive resistances in series with each other across a voltage source, and means responsive to the level of voltage at a point located circuitwise between said photosensitive resistances for establishing the direction of rotation of said DC motor by establishing the direction of current flow to said DC motor.

17. The combination according to claim 16, wherein are provided mechanical stops for said mirror located to assure precision of ultimate angular relation of said mirror at said 0° and 90° orientations.

18. The combination according to claim 17, wherein is provided a mechanical linkage having a rotatable shaft driven by said motor, an arm rigidly secured to said shaft and extending radially therefrom, and a flexible connection between said mirror and said arm.

19. The combination according to claim 18, wherein said flexible connection includes a hinge having one member secured to said mirror, a rigid bar rotatably secured at one of its ends to the free end of said arm and having its other end secured to another member of said hinge.

20. The combination according to claim 19, wherein said hinge is fabricated solely of flexible material.

21. The combination according to claim 19, wherein said switch actuator is rigidly related to said rotatable shaft and rotates therewith in equal angular relation.

* * * * *